United States Patent [19]

Vernon

[11] Patent Number: 5,413,007
[45] Date of Patent: May 9, 1995

[54] GAUGE ASSEMBLY FOR HANDLEBAR ATTACHMENT

[76] Inventor: Curtis Vernon, 1451 Underwood Rd., McKinleyville, Calif. 95521

[21] Appl. No.: 285,702

[22] Filed: Aug. 4, 1994

[51] Int. Cl.⁶ .............................................. G01D 7/02
[52] U.S. Cl. ..................................... 73/866.3; 248/904
[58] Field of Search .................. 73/756, 866.3, 493, 73/494; 116/306, 307, 311, 315, DIG. 43; 248/904, 214, 220.2, 225.31, 229, 230, 231.7, 251, 257, 288.1, 291, 314

[56] References Cited

U.S. PATENT DOCUMENTS

| | | | |
|---|---|---|---|
| 490,750 | 1/1893 | Kuhn. | |
| 1,425,190 | 8/1922 | Gerald | 248/230 |
| 1,471,985 | 10/1923 | Tower | 248/229 |
| 4,078,751 | 3/1978 | Stolzlechner | 73/493 |
| 4,896,559 | 1/1990 | Marier et al. | 74/551.4 |

Primary Examiner—Robert Raevis
Attorney, Agent, or Firm—James D. Givnan, Jr.

[57] ABSTRACT

A gauge mounting assembly for attachment to a motorcycle handlebar includes a housing in which an engine monitoring gauge such as an oil pressure gauge is positioned. The gauge is positionable within the housing for optimum visibility and lockable thereto. A bracket is attachable to a motorcycle handlebar at selected positions about the handlebar. An arm couples the housing to the bracket and permits adjustment of the housing in relation to the bracket. A modified form of the gauge assembly includes a bracket with the gauge housing disposed above the bracket by an arm member located perpendicular to the handlebar axis.

7 Claims, 1 Drawing Sheet

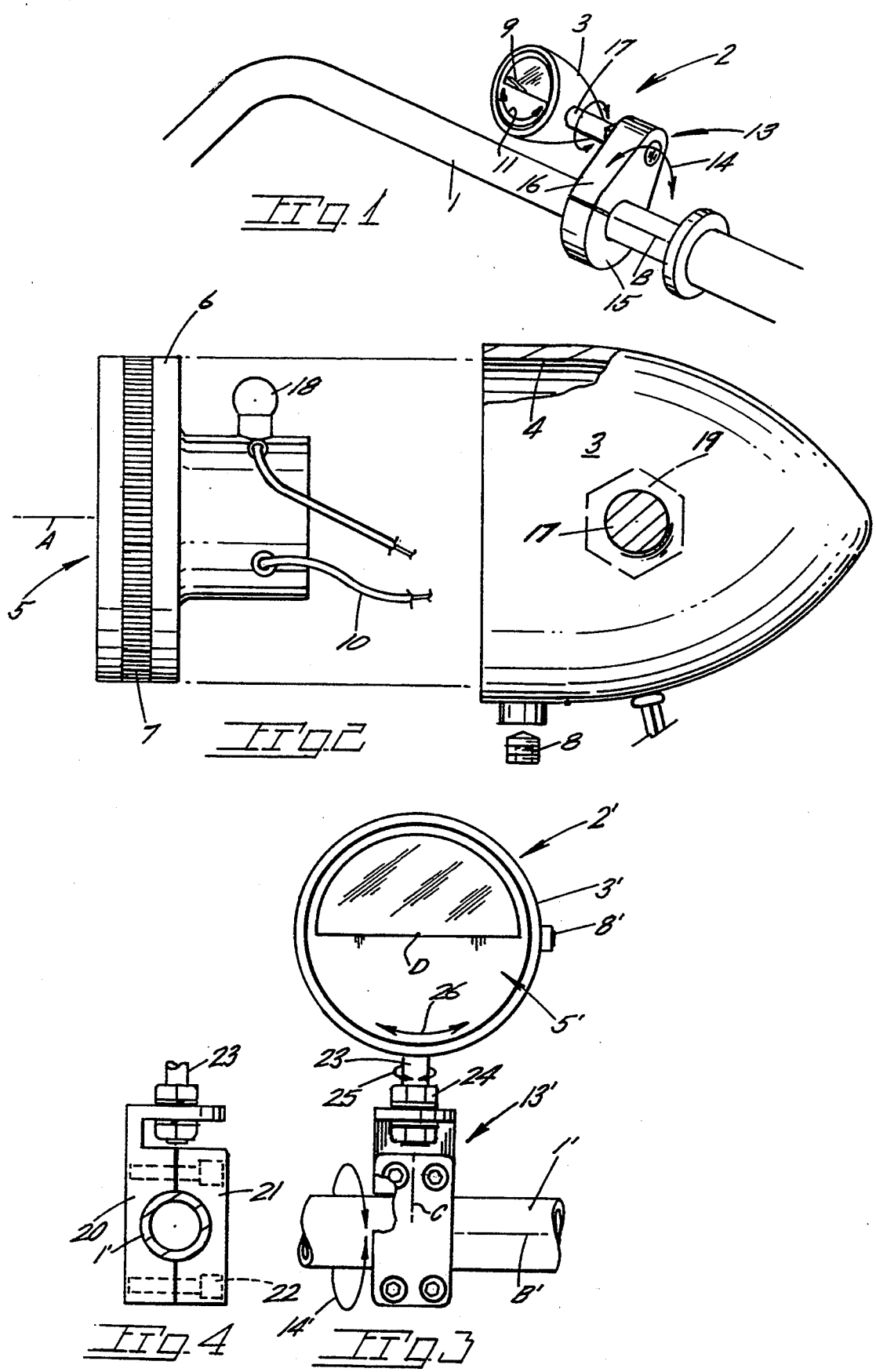

GAUGE ASSEMBLY FOR HANDLEBAR ATTACHMENT

BACKGROUND OF THE INVENTION

The present invention pertains generally to automotive type gauges and more particularly to a guage assembly for mounting to the handlebar of a motorcycle.

A problem exists in the operation of a motorcycle partly because such a vehicle requires the complete attention of the operator to the task of safe operation. Accordingly, monitoring of engine gauges is difficult and at best permits only intermittent glances at such gauges. The continued operation of a motorcycle with a malfunction of an engine or accessory component is particularly hazardous in view of the obvious consequences of sudden engine failure. Of particular concern is the loss of adequate oil pressure as may be detected initially by the gradual drop of such pressure which, if detected in time, permits safe corrective action. On the other hand, continued operation of the vehicle can result in damage to or destruction of the engine and serious consequences to the operator. Manufactures of motorcycles, for one reason or another, continue to locate engine gauges at a point remote from the operator's field of vision.

The mounting of an engine or an accessory gauge on the handlebars of a motorcycle is complicated by the fact that such handlebars are of various angular shapes and heights.

SUMMARY OF THE PRESENT INVENTION

The present invention is embodied within a gauge assembly particularly suited for installation on a motorcycle handlebar in a highly visible manner.

The present assembly includes a housing in which is positionably secured a gauge for monitoring engine operation such as an oil pressure gauge. Corresponding surfaces on the gauge perimeter and on the interior of the housing permit gauge rotation to the optimum position for monitoring. A lock on the housing retains the gauge in a selected position. A bracket of the present mounting assembly may be positioned about the major axis of the handlebar and thereat clamped into place. Extending from the bracket is an arm which serves to couple the gauge housing to the bracket and permits rotational movement of the housing, again to permit optimum viewing by the operator. A modified form of the present invention utilizes an angular bracket which receives an upright arm integral with the housing to permit housing and gauge adjustment about an upright axis.

Important objectives of the present invention include the provision of a handlebar mounted gauge assembly highly adaptable to various handlebar configurations to permit optimum viewing of the gauge by the motorcycle operator with minimal distraction from motorcycle operation; the provision of a gauge assembly positionable about multiple axes, for a motorcycle and located in the field of vision of the operator typically an oil pressure gauge, for viewing by the operator with minimal interference or detraction from motorcycle operation.

BRIEF OF THE DRAWINGS

In the accompanying drawings:

FIG. 1 is a perspective view of a handlebar fragment with the present gauge assembly mounted thereon;

FIG. 2 is an exploded side elevational view of the housing of the present assembly with the gauge removed therefrom;

FIG. 3 is a front elevational view of a modified form of the present gauge assembly; and FIG. 4 is an elevational fragmentary view taken from the left side of FIG. 3.

DETAILED DESCRIPTION OF THE PREFERRED EMBODIMENTS

With continuing attention to the drawings wherein applied reference numerals indicate parts similarly hereinafter identified, the reference numeral 1 indicates the handlebar of a motorcycle.

Indicated generally at 2 is the present gauge assembly in place on handlebar 1. The assembly includes a housing 3 having an internal wall surface 4. Surface 4 is cylindrical to receive an engine oil pressure gauge indicated generally at 5. Gauge 5 includes a cylindrical outer wall 6 which corresponds to inner wall surface 4 of the housing to permit installation of gauge 5 in the housing in a net fit in a manner permitting rotational positioning of the gauge about an axis A. Wall 6 may be provided with a serrated portion 7 for cooperation with a housing mounted set screw 8 which serves to lock the gauge at the selected rotated position relative housing 3. Gauge 5, in addition to including electrical components, is responsive to signals sent along a conductor 10 from an oil pressure sensing device. Gauge 5, while shown as being of the analog type having an indicator 9, may be of the digital type. From the housing and gauge thus described it will be seen that gauge 5 may be rotated about axis A in the directions of the arrow 11 and locked in place by set screw 8. Gauge illumination is by a light bulb at 18.

A mounting bracket is indicated generally at 13 for securement to handlebar I at selected locations about the handlebar axis at B as indicated by the double ended arrow 14. The bracket 13 includes a clamp 15 attached to a remaining bracket component at 16 by machine screws, the head of which may be inset within the clamping member. An arm 17 is in threaded engagement with bracket 13 and lockable thereto by a nut 19 to provide an adjustable coupling.

In the modified form of the invention shown in FIGS. 3 and 4, the gauge assembly 2' is also adapted for movement about multiple axes to provide optimum viewing with minimal distraction to the vehicle operator. The handlebar at 1' has an axis at B' with a bracket thereon indicated generally at 13'. The bracket includes an angular member at 20 while a clamp 21 is secured to angular member 20 by machine screws 22. An arm at 23 serves as coupling means to join the gauge generally at 5' in an adjustable manner to bracket 13'. Fastener elements as at 24 lock the arm in place. The housing 3' receives oil pressure guage 5' in the adjustable manner above described with the preferred form of the invention with like components being indicated with prime reference numerals. The housing 3' is rotatably adjustable about an axis C per arrow 25 while the gauge 5' is rotatably adjustable about an axis at D per arrow 26.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

I claim:

1. A gauge assembly for mounting on the handlebar of a motorcycle, said assembly comprising,
    a housing having an internal wall defining an open area,
    a bracket for attachment to said handlebar,
    adjustable coupling means joining said housing to said bracket, for supporting said housing above the handlebar of the motorcycle,
    an oil pressure gauge for monitoring engine operation disposed in said open area of the housing and including an outer wall corresponding to a portion of the internal wall of said housing and permitting rotational adjustment of the gauge in said housing, and
    locking means carried by said housing and engageable with said gauge and locking the gauge to said housing in a selected position, said locking means including a set screw carried by said housing and engageable with said outer wall of the housing.

2. The assembly claimed in claim 1 wherein said portion of the internal wall of the housing and said outer wall of the gauge are cylindrical.

3. The assembly claimed in claim 1 wherein said outer wall of the guage is serrated to enhance set screw engagement.

4. The assembly claimed in claim 1 wherein said bracket and said adjustable coupling means are positionable respectively about parallel axes.

5. The assembly claimed in claim 1 wherein said bracket is positionable about a major axis of the handlebar, said adjustable coupling means includes an arm member having a major axis in a plane perpendicular to the major axis of the handlebar.

6. In combination,
    a motorcycle handlebar,
    housing having an internal cylindrical wall defining an open area,
    a bracket for attachment to said handlebar,
    adjustable coupling means joining said housing to said bracket and supporting said housing in upwardly spaced relationship to said handlebar,
    an oil pressure gauge for monitoring engine operation disposed in said housing and including a cylindrical outer wall corresponding to said internal cylindrical wall of said housing and permitting rotational positioning of the gauge in said housing, and
    locking means carried by said housing and engageable with said gauge for locking the gauge to said housing in a selected position.

7. The combination claimed in claim 6 wherein said outer wall of the gauge includes a serrated portion, said locking means including set screw engageable with said serrated portion.

* * * * *